Feb. 7, 1967 A. L. BAKER ET AL 3,302,511
OPTICAL SYSTEM FOR DETERMINING DEVIATION IN BODY ORIENTATION
Filed June 30, 1961 4 Sheets-Sheet 1
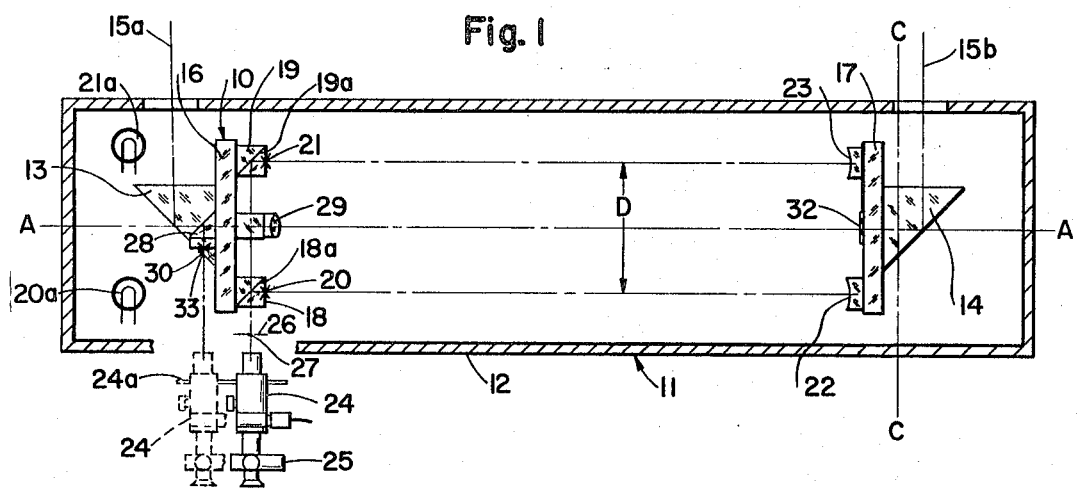
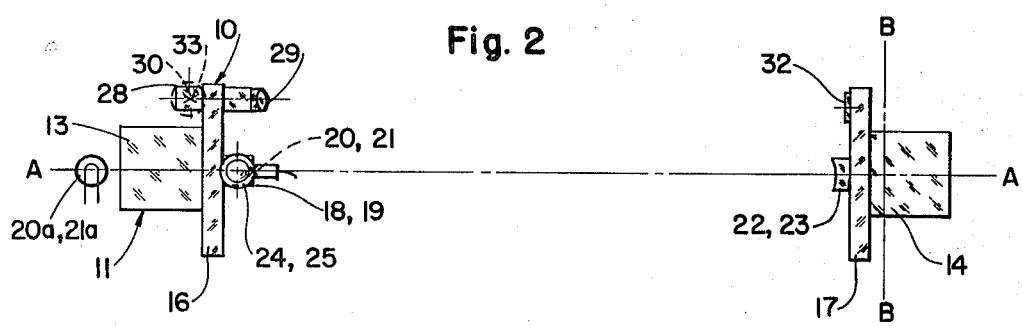
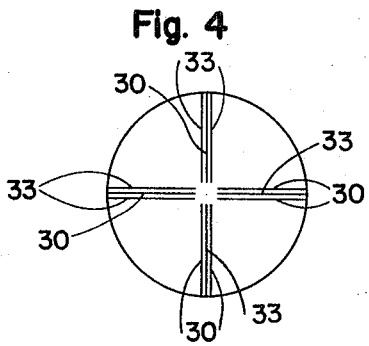
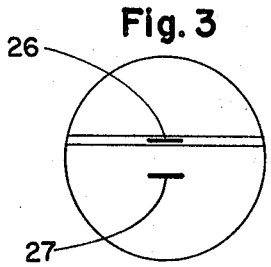
INVENTORS
ALLISTER L. BAKER
GEORGE GEIER
CONWAY D. HILLMAN
BY
J. Russell Juten
ATTORNEY

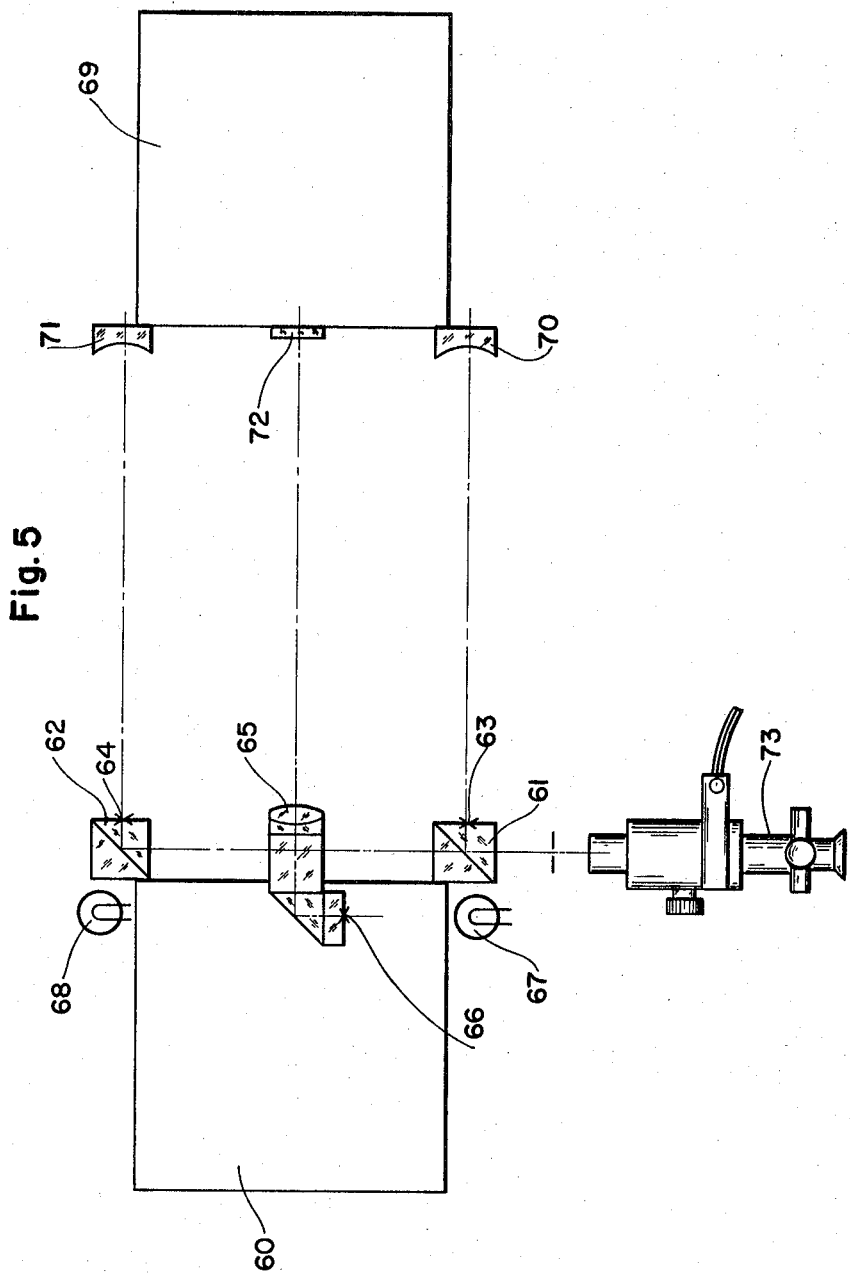

Feb. 7, 1967  A. L. BAKER ETAL  3,302,511
OPTICAL SYSTEM FOR DETERMINING DEVIATION IN BODY ORIENTATION
Filed June 30, 1961  4 Sheets-Sheet 3

INVENTORS
ALLISTER L. BAKER
GEORGE GEIER
CONWAY D. HILLMAN
BY
J. Russell Juton
ATTORNEY United States Patent Office 3,302,511
Patented Feb. 7, 1967

3,302,511
OPTICAL SYSTEM FOR DETERMINING
DEVIATION IN BODY ORIENTATION
Allister L. Baker, Denville, George Geier, Teaneck, and
Conway D. Hillman, Millburn, N.J., assignors to Keuffel & Esser Company, Hoboken, N.J., a corporation
of New Jersey
Filed June 30, 1961, Ser. No. 121,133
7 Claims. (Cl. 88—14)

This invention relates to optical means, optical systems, and methods for determining and checking the deviations in the relative orientations of a plurality of bodies or surfaces with respect to one another or with respect to a datum or with respect to a control check body. This invention refers more particularly to optical means, optical systems, and methods for determining and checking the deviations in the relative orientations of one portion of a primary optical system with respect to other portions of the primary optical system and is particularly useful for determining and controlling any error or deviation in the primary optical system itself. The optical means or optical system used for checking and determining the deviation in the relative orientation of the primary optical system, may itself be a part of the primary optical system, thus resulting in a self-checking optical system suitable for dependable high precision measuring work.

The present invention may be used as a primary optical system for determining and checking the deviations of other bodies, or it may be used as a secondary optical system to check deviations in a primary optical system, or it may be used as a portion of a primary optical system whereby the optical system becomes self-checking.

As is well known optical systems are used to precisely control, align, check, and in other ways aid in the regulation of simple and complex machinery, devices, and systems in industrial fields and elsewhere. Since the optical system itself is used as a precise control, any error or deviation which may occur either gradually or at random in the optical system causes the optical system to lose its precise measuring characteristics so that it no longer can precisely and dependably perform its function.

In the prior art it has been very difficult and often impossible to determine errors or deviations in the high precision measuring optical systems while in use or just preparatory to use. Often the instrument and the optical system had to be returned to the factory for periodic checking. This has resulted in industry and others having to depend on optical systems for high precision work when there was no certainty that the optical system itself was operating in a proper manner during the times or periods in which it was in use. The prior art has not solved this problem although attempts have been made by using electrooptical equipment as well as optical systems, but it has not achieved a high precision optical deviation checking system. In prior art some attempts have also been made to check optical measuring systems by using index marks on various portions of the optical system. The index marks would be visually observed and deviations noted. The accuracies attainable by these checking systems, however, is well below that necessary for accurately checking the deviations of bodies or optical systems.

An object of the present invention is to provide optical deviation checking means and optical deviation checking systems and methods not having the disadvantages of prior art.

Another object is to provide optical means, optical systems, and methods for determining and checking deviations in the relative orientations of a plurality of bodies or surfaces with respect to one another or with respect to a datum or control body about three mutually perpendicular axes.

Another object is to provide optical means and systems and methods for determining and checking the deviation or error of a primary optical system.

A further object is to provide optical deviation checking means and optical deviation checking systems which are a portion of a primary optical system so that the primary optical system is self-checking.

A still further object is to provide optical deviation checking means and optical deviation checking systems of high preicsion which are easily operated and which are easily integrated into various physical and optical systems.

Other objects of the present invention will become apparent in the course of the following specification.

The objects of the present invention may be realized through the provision of optical means or optical systems comprising observing means, and indexing means and reflecting means supported on or disposed with respect to the various bodies or surfaces whose relative orientations and deviations are being determined. The relative positions of the indexing means and its images as viewed through the observing means determines the actual deviation from a datum or normal value of the relative orientations of the various bodies involved, thus determining the relative orientations of the respective bodies.

The invention will appear more clearly from the following detailed description when taken in connection with the accompanying drawings, shown, by way of example, preferred embodiments of the inventive idea.

In the drawing:

FIGURE 1 is a plan view partly in section of one embodiment of the present invention for determining and checking the deviations in the relative orientations of the various optical components of the optical instrument shown;

FIGURE 2 is a side view of the embodiment of FIGURE 1 but without showing the housing;

FIGURE 3 shows the microscope cross hairs and images of the indexing means for a setting when deviation about the axis A—A is being checked;

FIGURE 4 shows the view as seen through the microscope eyepiece for the auto-collimating check about axes B—B and C—C;

FIGURE 5 is a schematic showing the present invention for checking the deviations in relative orientation of any two bodies;

FIGURE 6 is a plan view partly in section showing another embodiment of the present invention.

Figure 7:
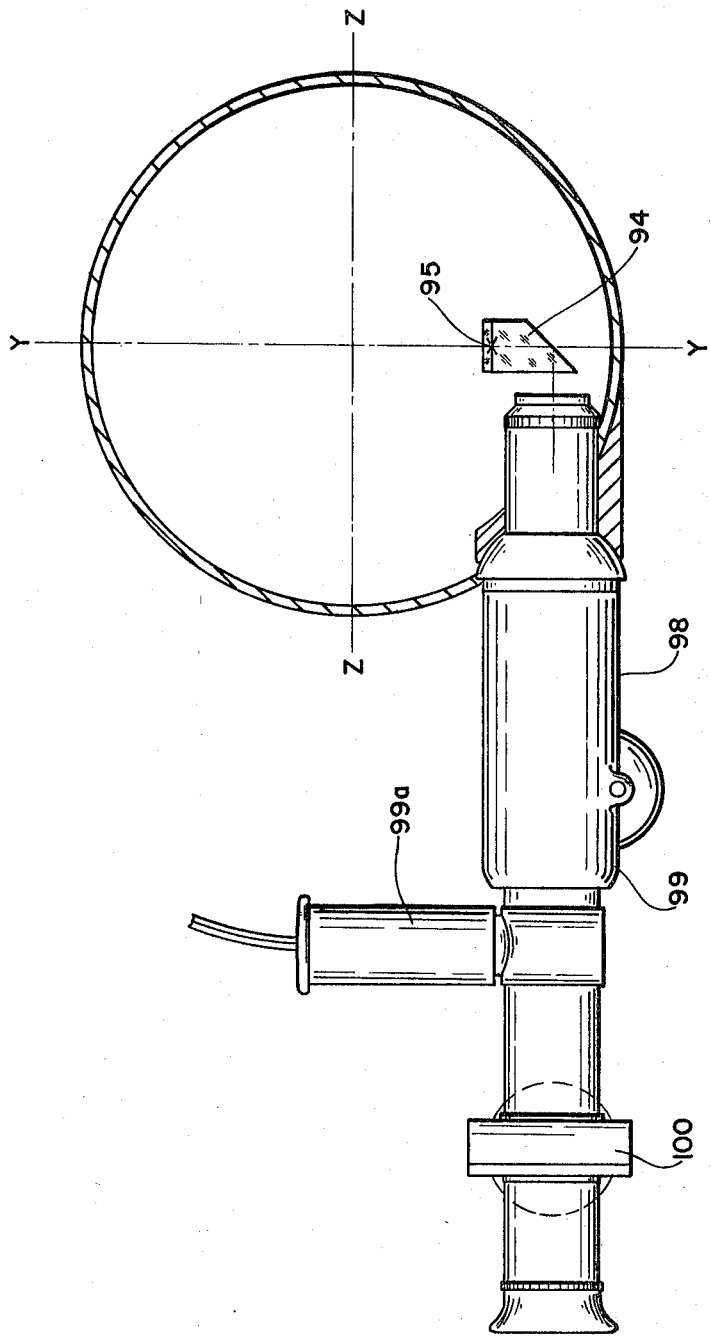
FIGURE 7 shows observing means used with the embodiment of FIGURE 6.

Optical means 10 of the present invention is shown in preferred embodiment in FIGURE 1 adapted for use with the periscope type optical instrument 11. The optical instrument 11 comprises a casing or housing 12, a first optical component 13 and a second optical component 14 remote from the first optical component 13. The optical components 13, 14 are shown as triangular prisms but can be any optical component including penta prisms, reflectors mirrors, and the like. In usual usage a main line of sight 15a enters an opening at the left end of the casing 12 of the optical instrument 11 as shown in FIGURE 1, is incident upon the first optical component 13 and is deviated 90° therefrom toward the second optical component 14, from which it is deviated 90° out of the right end of the casing 12 of optical instrument 11. In this particular case, for example, when the optical instrument 11 is functioning properly the portion of the line of sight 15b leaving the casing 12 from the second optical component 14 is precisely parallel to the portion of the line of sight 15a incident upon the first optical component 13. An instrument of this nature is used for very precise work and therefore deviations in the relative orientations of the various parts of the instrument will cause errors which will go undetected unless there is means for determining and checking the accuracy of the instrument itself. The variations and deviations may be due to many factors, for example, temperature changes, differential temperatures in various parts of the instrument, vibrations, usage, rough handling, and other forces to which such instruments are either systematically or randomly exposed.

Assuming, for example, that the first optical component 13 remains stationary, then the second optical component 14 if deviated from the desired relative orientation, could cause error and inaccuracy by movement about the axes A—A, B—B, C—C shown in FIGURES 1 and 2.

It is the purpose of the present invention to enable one to readily ascertain, for example, the amount of deviation in relative orientation which exists at any given time between the optical components 13 and 14 about the axes A—A, B—B and C—C, or any other three mutually perpendicular axes.

When the deviations have been determined, corrective measures may be undertaken, and then assurance will be had that the optical instrument 11 functioning properly and accurately.

The deviation of one portion of the optical instrument 11 with respect to another portion, about the longitudinal axis A—A is generally referred to as torsional twist. This torsional twist deviation may be determined by the present invention as shown in FIGURES 1 and 2.

In the present invention a first plano parallel glass plate 16 is secured by optical contact to optical component 13. Optical contact is preferable for securing one optical component to another because then no variations due to cement will be introduced into the system.

A second plano parallel glass plate 17 is secured to optical component 14 by optical contact. Prisms 18 and 19 are secured by optical contact to the plano parallel glass plate 16 as shown. Prism 18 carries a reticle, index mark, or indexing means 20 while prism 19 carries a reticle, index mark, or indexing means 21. Each of the indexing means 20, 21 are preferably single horizontal lines. Two imaging means such as spherical reflecting mirrors 22, 23 are secured by optical contact to the plano parallel glass plate 17 as shown in FIGURES 1 and 2.

Plano-parallel glass pates 16 and 17 are used as a convenient means of securing prisms 18, 19 and spherical reflecting mirrors 22, 23 to the optical components 13, 14 without interfering with the main line of sight 15, however, the prisms 18, 19 and mirrors 22, 23 may be secured to optical components 13, 14 without using the plano-parallel plates 16, 17.

The imaging means 22, 23 can be any spherical or aspherical image forming reflector means such as the spherical reflector mirrors shown. Thus the imaging means 22, 23 can be paraboloid or ellipsoid or any shape reflecting means which forms an image.

The center line to center line distance D between the spherical reflecting mirrors 22 and 23, should be equal to the centerline distance from the center of indexing means 20 to the center of indexing means 21.

A microscope 24 having a filar micrometer 25 is so disposed in position that it may view the reflected images of reticles 20, 21. The same microscope 24 can be used to determine the check relative torsional twist about longitudinal axes A—A and also for the auto collimation check for deviations about axes B—B and C—C. The microscope 24 can be shifted from one position for determining deviation about axes A—A to another position for determining deviation about axes B—B and C—C by means of a slide or bracket 24a shown in FIGURE 1, and can be removed completely when not in use. The positions for the microscope 24 indicated in FIGURE 1 may be varied and the optical paths of the system can be modified so as to allow the microscope 24 to be mounted in more convenient locations for any particular optical instrument.

The manner of determining and checking torsional twist by means of the present invention is as follows:

An image 26 of the indexing means 20 is formed by the spherical mirror imaging means 22, at a point as shown in FIGURES 1 and 3. The image 26 is formed by a path of a beam of light from a light source 20a passing through prism 18 past indexing means 20 to the spherical mirror imaging means 22 from which it is reflected back to the prism 18. The optical path after reflection by the mirror 22 is bent 90 degrees by the beam splitting surface 18a of prism 18. Simultaneously, an image 27 of the indexing means 21 is formed by the spherical mirror imaging means 23. The image 27 is formed by a path of light from light source 21a passing through prism 19 past indexing means 21 to spherical mirror imaging means 23 from which it is reflected back to prism 19, and the optical path is then bent 90 degrees by reflection from the beam splitting surface 19a of prism 19. Images 26, 27 are on the same plane and their vertical separation is measured by observing and measuring means such as microscope 24 and filar micrometer 25.

Each of the indexing means 20, 21 preferably consists of a single horizontal line, and the filar micrometer 25 on the microscope 24 is provided with paired horizontal crosshairs of suitable spacing to straddle either of the images 26, 27. The vertical spacing between the images 26 and 27 is measured initially by averaging a series of readings when the deviation of the principal line of sight of the instrument 11 through the optical components 13, 14 has been determined to be within the allowed tolerance. This calibration figure or standardization figure for the spacing of images 26, 27 is constant when once determined. In order to check the twist about axis A—A of optical component 14 relative to optical component 13, it is only necessary to take a series of readings of the vertical spacing between the images 26, 27 and to compare the average with the predetermined value. The difference in these values will represent the twist error in seconds. In other words, the deviation of the optical components 13, 14 about the axis A—A is equal to the difference between the microscope field reading of the vertical distance between the images 26 and 27 and the calibration figure previously determined, which due to the filar micrometer calibration is the twist error in seconds.

If, for example, there is a twist T of optical component 14 with respect to optical component 13, about an axis through indexing means 21 and spherical mirror 23, the spherical mirror 22 will move vertically an amount $D \sin T$. Therefore there will be a vertical displacement between the optical axis of the spherical mirror 22 and the indexing means 20 of $D \sin T$, and a vertical displacement of approximately $2D \sin T$ between the images 26 and 27. However, since the distance from the image 26 to the spherical mirror 22 is somewhat greater than the distance from the indexing means 20 to spherical mirror 22 this is only an approximate figure. Assuming the distance D between the lines of sight from indexing means 20 to spherical mirror 22 and from indexing means 21 to spherical mirror 23 is equal to 4 inches, the vertical displacement then between the images 26 and 27 will be equal to $2 \times 4 \times .000005$ (the latter figure being the approximation for the sine of one second) and this equals approximately .00004" or approximately 1 micron. Standard microscopes are available with filar micrometer drums graduated to read directly in microns and when used in the present case each drum graduation will correspond therefore to a second of twist between the optical components 13 and 14.

The imaging means 22, 23 are preferably spherical mirrors instead of lenses. Advantages of using the spherical mirrors 22, 23 are that the chromatic aberration of a mirror is zero, and further that there is no need for color correction. Furthermore, since both the image and object are relatively close to the center of curvature of the mirrors, and since the diameter of the mirrors is relatively small, the spherical aberration is negligible. Consequently the image quality is essentially diffraction limited.

The resolving power in seconds can be determined by the formula: Resolving power=$4.6/d$.

Where 4.6 is a constant for the normal human eye, and $d$ equals the aperture of the spherical mirrors 22, 23. Assuming the aperture of the mirrors 22 and 23 is equal to one inch, the resolving power is therefore 4.6 seconds. Assuming the distance between the main line of sight entering and leaving the optical instrument 11 is equal to 70 inches, the minimum line separation that can be resolved is equal to .000023 × 25.4 which is equal to 41 microns. However, since only one line is necessary for each of the indexing means 20, 21 these can be made, for example, 50 microns in width and will be readily resolved.

It should be noted that with respect to the determination of the torsional twist or deviation of the relative orientations of he respective optical components about the longitudinal axis A—A, there is no cross coupling of errors. Should the optical components 13 and 14 move with respect to each other about axes perpendicular to the plane of FIGURE 1, the only effect on the images 26, 27 will be horizontal movement. The vertical separation of these images 26, 27 will in no way be affected. If optical components 13, 14 are penta prisms, such movement will not effect the parallelness of the main line of sight entering and leaving the periscope instrument 11.

In this particular optical instrument 11 if penta prisms are used the optical system shown in insensitive to twist of one end assembly with respect to the other about an axis perpendicular to the plane of FIGURE 1. However, it should be noted that while no correction or deviation check would then be necessary for rotation about the axis B—B in this particular instrument, the present invention is fully capable of determining this deviation.

Should the optical components 13 and 14 twist with respect to each other about an axis in the plane of FIGURE 1 but perpendicular to the longitudinal axis A—A, this will cause an equal vertical displacement of both of the images 26 and 27. Therefore it will not affect the vertical separation of the images 26, 27 and there will be no effect on the microscope reading.

The presence of deviations that axes B—B and C—C and the effect on the parallelness of the principal line of sight 15a, 15b is also determined by the present invention.

As shown in FIGURES 1 and 2, a right angle prism 28 is secured to the plano-parallel glass plate 16, as well as objective 29 and indexing means 30. The microscope 24 forms the eyepiece of an auto-collimator and can be the same microscope 24 used for the torsional twist check about axis A—A. A reflecting surface 32 is provided on the plano parallel glass plate 17, and can be any zero power reflecting means such as totally or partially flat reflecting surfaces and reflecting prisms of any nature. The optical path of light for the check of deviations about axes B—B and C—C is from the microscope 24 past the indexing means 30, then reflected by the right angle prism 28 through the plano parallel glass plate 16, through the objective 29 which it leaves as parallel light to reflecting surface 32 from which it is reflected back through the objective 29, plano parallel glass plate 16, and right angle prism 28, forming an image 33 of the indexing means 30 in the plane of indexing means 30 and in the view of the microscope 24. Indexing means 30 is in the focal plane of objective lens 29 which can act as a collimating lens. This optical path is entirely outside of the limits of the aperture of the main optical system which is a distinct advantage since this permits the use of a full reflecting front surface mirror 32 for optimum auto-collimation. The rest of the plano parallel glass plate 17 can be anti-reflection coated for optimum transmission of the main line of sight. If this check were performed along the main line of sight, a reflection enhancing coating would have to be applied on the surface of plano parallel glass plate 17 in the main optical path, thus reducing the light transmitted through the plate 17 for use in the main optical path.

If there is a twist A of optical component 14 with respect to optical component 13 about axis C—C, it will cause a vertical displacement of the auto-collimated image 33 with respect to the lines of the indexing means 30, equal to $2f$ tangent $A$, where $f$ is the focal length of the objective. The indexing means 30 in this case comprises two sets of lines at right angles each set comprising a single line on one side and two split lines on the other side as shown in FIGURE 4. When there is proper alignment or orientation between the optical components 13 and 14, the lines and the images of these lines will appear to be evenly disposed or in register when viewed through the microscope as shown in FIGURE 4. This is often referred to as being in coincidence although the lines are not superimposed on one another.

Assuming the focal length $f$ is 100 millimeters, the displacement corresponding to 1 second will be: 200×.000005 millimeters which is equal to 1 micron. The microscope 24 is chosen with the filar micrometer 25 having each drum division equal to one micron. In the present case, each drum graduation therefore will correspond to 1 second of sag twist, which in other words means 1 second of twist about axis C—C. If the indexing means and image are not properly aligned the filar micrometer 25 is used to obtain proper alignment or coincidence and the micrometer reading will give the deviation in seconds.

It is also well known that the sag twist about axis C—C also affects the torsional twist about axis A—A on a 1 to 1 basis where optical components 13, 14 are used. Therefore any error measured about axis C—C must be combined with the error measured for the torsional twist about axis A—A in order to determine the error in parallelness between the entering and exiting main lines of sight in the vertical plane. This is not the case however if the end assemblies 13, 14 are not optical components.

Assuming the lens 29 is diffraction limited, its resolving power will be 4.6 seconds for an aperture of 1 inch. At the 100 millimeters focal length it will resolve lines separated by .000023 × 100 which is equal to 2.3 microns. An indexing means, line width of approximately 10 microns may be used therefore to provide a good quality auto-collimated image, even allowing for some loss in resolving power due to lens aberration.

For checking deviation about the vertical axis B—B, the image of a vertical portion of the indexing means 30 will be observed to be displaced in the focal plane from the vertical indexing means an amount equal to twice the angle of deviation times the focal length of the objective at the reticle. Otherwise the optics involved and the manner of practicing the invention is similar to checking about axis C—C.

Again it should be noted that the present invention prevents any possibility of movement between the essential parts of the auto-collimator 31 and the optical component 13, and between the reflecting surface 32 and the optical component 14. All of the essential parts are glass in surface to surface optical contact. Wherever possible the same type of glass may be used to eliminate differences in coefficient of expansion between these parts. Furthermore optical contact is preferably used since it has well known advantages over cementing.

It should be further noted that if desired no air space need be allowed between the objective 29 and the reticle 30, and while this makes correction of the lens aberration more difficult it further insures the stability of the checking system.

The auto-collimation check for deviations about axes B—B and C—C is insensitive to twist about the longitudinal axis A—A. The degree to which twist or deviation about the vertical axis B—B will affect twist about the horizontal axis C—C will depend only on how accurately the indexing means lines are lined up with respect to these axes. Assuming B to be the error in this alignment; then if G is the twist about a vertical axis, its apparent affect on the measured sag error will be $G \sin B$. If G were 10 seconds, for example, B would have to be 5.7 degrees to cause an apparent sag error about axis C—C of 1 second, and such a gross misalignment of the recticle lines would be readily discernible during instrument assembly.

Among the advantages of the present invention is the stability which is attained within each optical assembly. For example, on one end of the instrument 11, the optical component 13, indexing means 20, and prism 18, prism 28, objective 29, and indexing means 30 are provided practically on one single piece of glass. On the other end, the two spherical mirrors 22, 23 and the reflecting surface 32, and optical component 14 are also provided practically as a single piece of glass. Thus there is no possibility of movement between the optical component parts of an assembly. It should also be noted that exactly the same type of optical glass can be used throughout, so that no strains will be set up due to temperature changes which could effect the relative position of the parts. The glass parts can be assembled by optical contact so no variations due to cement will be involved. Each of the plano parallel glass plates 16 and 17 is kinematically mounted in the optical instrument 11 so that strains will not be transmitted to them from the instrument housing 12.

While the above description of the invention has been with respect to a primary optical system whose members may or may not be physically connected to one another, it should be noted that the present invention may be used in many other ways.

Another embodiment of the present invention, as shown in FIGURE 5, may be used to determine the relative deviation about three mutually perpendicular axes of any two bodies 60, 69, whether these bodies are physically interconnected or not. As shown schematically in FIGURE 5, the body 60 carries two prisms 61, 62 having indexing means 63, 64, and an objective 65 and an indexing means 66. Two light sources 67, 68 are disposed behind prisms 61, 62. Body 69 has image forming reflectors 70, 71 and a reflector surface 72. The bodies 60, 69 do not necessarily have to be connected and may for example, be portions of machines, also planes, orifice openings, or any other bodies for that matter. The various parts of this embodiment including the observing and measuring means 73 (such as microscope and micrometer) are similar to the parts described with respect to the embodiment of FIGURE 1, and is operated in similar manner. If, for example, the bodies 60, 69 are parts of a machine, once the initial set-up has been made, checked, and calibrated, then the operation of determining the relative deviations of the bodies 60, 69 are the same as those described with respect to FIGURE 1.

Another embodiment 80 of the present invention is shown in plan view partially in section in FIGURE 6, wherein is shown an optical instrument 81 comprising housing 82 having end caps 82a, 82b having openings 83 and 84, an optical component such as the roof edge prism 85 which is connected to the housing 82 at one end of instrument 81 near opening 83, and an optical component such as reflector 86 which is connected to the housing 82 near opening 84.

A main line of sight 87a enters opening 83 and is incident upon prism 85 from which it is deviated 90° to the reflector 86 from which it again is deviated 90° and leaves instrument 81 through opening 84 as main line of sight 87b which is parallel to line of sight 87a when instrument is in perfect order.

Prisms 88 and 89 are secured to prism 85 by optical contact. The prism 88 has a beam-splitting surface 88a such that the path of a beam of light coming from light source 90 through the optical member 91 is split into two portions, one portion of the light path 90b is deviated 90° by the beam-splitting surface 88a and passes the reticle or indexing means 92 supported on prism 88. The other portion of the path of light 90c passes the beam-splitting surface 88a and is incident upon prism 89 from which it is deviated such that the angle between the deviated light from prism 89 and the path of light 90c incident upon prism 89 is less than 90° due to the shape of prism 89. Prism 89 supports a reticle or indexing means 93. Surface 88b is a reflection surface.

The roof edge prism 85 is rigidly connected to the housing 82 by any suitable means 101 such as cementing, or fastening by mecahnical means such as screws and plates and the like.

A steel block 86a is adjustably connected to the housing 82 by adjustable means 102 and reflector 86 is rigidly connected to the steel block 86a. A prism 94 having an index mark or indexing means 95 is also rigidly connected to steel block 86a, and optical imaging means such as objective lens 96, and bi-prism 97 are also rigidly connected to steel block 86a. Therefore, when in use, the steel block 86a, reflector 86, prism 94, imaging means 96, and bi-prism 97 all form a single unit so that there is no relative movement between them. Indexing means 95 is at the focal plane of objective lens 96 which can act as a collimating lens.

The upper portion 97a of bi-prism 97 will transmit light directly through the prism 97 without deviation, while the lower portion 97b will bend light rays transmitted therethrough.

Observing and measuring means 98 such as the microscope 99 and filar micrometer 100 of FIGURE 7 are disposed so as to view the prism 94. The microscope 99 contains a light source 99a and also serves as an eyepiece of an autocollimator.

Adjustment means 102 are used for adjusting steel plate 86a with respect to the housing 82 and also for adjusting the orientations of reflector 86 with respect to housing 82 and prism 85. Prism 85 is rigidly connected by fastening means 101 to the housing 82.

This embodiment of the present invention determines the deviations in relative orientation between prisms 85 and reflector 86 about any three mutually perpendicular axes, thereby the relative orientations of these bodies may be determined with respect to any datum whatsoever, as is well known from analytic geometry.

The manner of use and operation of this embodiment of the present invention is as follows:

To determine the deviations in relative orientation about the axis X—X, for example, a beam of light 90a is emitted from light source 90 and is split into two portions by the beam-splitting surface 88a, such that one portion 90b is deviated 90° by the beam-splitting surface 88a passed indexing means 92. The other portion of the beam of light 90c passes the beam-splitting surface 88a and is incident upon prism 89 from which it is deviated such that the deviated beam of light makes an angle of less than 90° with the beam of light incident upon prism 89, and the deviated beam passes indexing means 93.

The path of beam of light 90b leaving prism 88 is incident upon the upper portion 97a of bi-prism 97 and passes therethrough without deviation and passes then through imaging means 96 and is incident upon reflector 86 from which it is reflected, and an image of reticle 92 is formed in a plane. The microscope 99 can be focused on this plane.

The path of the beam of light 96c leaving prism 89 is incident upon the lower portion 97b of bi-prism 97, and is deviated by the bi-prism portion 97b through the imaging means 96 parallel to the beam of light 90b, after which it is incident upon the reflector 86, and an image of indexing means 93 is formed on the same plane as the image of indexing means 92 by imaging means 96. Both images are observed through the microscope 99 when it is focused on said plane and the distance between said images may be measured by means of the filar micrometer 100. The instrument is calibrated by adjusting reflector 86 when it is known that the entering and exiting portions 87a and 87b of the main of line of sight are within the necessary tolerances. At the time of the calibration the distance between the images is determined so that any variation from this known value is an indication of the deviation in relative orientation of reflector 86 and prism 85 about axis X—X as explained previously.

The determination of the deviations in relative orientation about axes Y—Y and Z—Z which are mutually perpendicular and both of which are perpendicular to axes X—X, is as follows:

Microscope 99 is refocussed on the plane of indexing means 95 and light from the micrometer passes indexing means 95 and is incident upon reflector 86 and passes through objective lens 96 which acts as a collimating lens. After the light has passed through objective lens 96, the light is collimated light. The collimated light passes through bi-prism 97 and the part of the light passing through the lower portion 97b is diffused. The collimated light passing through the upper portion 97a remains collimated and is incident upon the reflecting surface 88b of prism 88. From there it is reflected back through portion 97a of bi-prism 97 and passes through the imaging means 96, is reflected from reflector 86, and an image of indexing means 95 is formed at the plane of the indexing means 95 which is also the focal plane of objective 96. The indexing means 95 comprises indexing marks at right angles to one another. The observing and measuring means 98 are used to measure the distance between the indexing means 95 and its image from which deviations in relative orientation of reflector 86 with respect to prism 85 about axes Y—Y and Z—Z can be determined.

The adjusting means 102 may then be used to make any necessary adjustment.

In the present invention the twist deviation may be determined for any axis parallel to any axis passing through said bodies. The total deviation check may be made with respect to three mutually perpendicular axes from which the results can be related to any desired axis or datum.

Among the advantages of the deviation checking system of the present invention are the following:

The checking system can check relative deviations of any bodies about any three mutually perpendicular axes between; i.e. the total deviation may be determined.

The present invention further does not result in any loss of light when auto-collimating along the main optical path; and the invention can be built to make possible observations from any angle around the equipment. Further the present invention can be used as part of a self-checking optical system.

It is apparent that the described examples are capable of many variations and modifications within the scope of the present invention. All such variations and modifications are to be included within the scope of the present invention.

What is claimed is:

1. Optical means for determining deviation in relative orientation about three mutually perpendicular axes of two bodies lying on a major datum axis comprising:
    (a) first indexing means connected to the first of said bodies;
    (b) second indexing means connected to said first body and lying in a common plane with said first indexing means, said plane being perpendicular to said datum axis;
    (c) an objective connected to said first body;
    (d) third indexing means connected to said first body and disposed at the focal plane of said objective;
    (e) first image-forming reflecting means connected to the second of said bodies;
    (f) second image-forming reflecting means connected to said second body;
    (g) zero power reflecting means connected to said second body;
    (h) means for projecting first and second light beams respectively to said first and second indexing means, thence to said first and second image-forming reflecting means along paths parallel to said datum axis, said reflecting means being so disposed as to form images of said first and second indexing means proximately juxtaposed at a common plane;
    (i) means for projecting a third light beam to said third indexing means, thence to said objecting from which said beam emerges as collimated light, thence to said zero power reflecting means along a path parallel to said datum axis, said reflecting means being so disposed as to reflect said beam to said objective, whereby an image of said third indexing means is formed at said focal plane;
    (j) means for observing said first and second index images and establishing the separation between said images at said image plane, variations in said separation indicating deviations in relative orientation of said first and second bodies with respect to said major axis; and
    (k) means for observing said third indexing means and its image and establishing the separation between said third indexing means and its image in two perpendicular directions at said focal plane, variations in said separations indicating deviations in relative orientation of said first and second bodies with respect to two perpendicular axes disposed normal to said major datum axis.

2. Optical means for determining deviation in relative orientation about three mutually perpendicular axes of two bodies lying on a major datum axis comprising:
    (a) means for projecting a pair of parallel light beams in a plane parallel to said major axis;
    (b) first indexing means supported by the first of said bodies and disposed in the path of the first of said light beams;
    (c) second indexing means supported by said first body and disposed in the path of the second of said light beams;
    (d) first and second imaging means supported by the second of said bodies and disposed respectively in said first and second light beam paths to receive light proceeding from said first and second indexing means and to image said first and second indexing means proximately juxtaposed at a mutual plane;
    (e) means for observing the spacial relationship between the images of said first and second indexing means at said mutual plane, said relationship being a function of a deviation in relative orientation of said bodies about said major axis;
    (f) a collimating lens supported by one of said bodies;
    (g) third indexing means supported by said one body and disposed at the focal plane of said collimating lens;
    (h) means for projecting a third beam of light through said third indexing means and said collimating lens, thence along a path parallel to said major axis;

(i) zero power reflector means supported by the other of said bodies from that one body supporting said third indexing means and disposed in the path of said projected third light beam so as to reflect said beam through said collimating lens and image said third indexing means in the plane of said third indexing means; and (j) means for observing the spacial relationship between said third indexing means and the image of said third indexing means at the plane of said third indexing means, said relationship being a function of the deviations in relative orientation of said bodies about axes mutually perpendicular and perpendicular to said major axis.

3. The invention according to claim 2 including means for measuring said spacial relationships, said measuring means being calibrated in units of actual deviations in relative orientation of said bodies.

4. A self-checking optical system comprising:
(a) a first optical component for receiving and transmitting incident light rays;
(b) a second optical component for receiving said light rays transmitted from said first component along a major datum axis and for further transmitting said light rays;
(c) means for projecting a pair of parallel light beams in a plane parallel to said major axis;
(d) first indexing means supported by one of said optical components and disposed in the path of the first of said light beams;
(e) second indexing means supported by said one of said optical components and disposed in the path of the second of said light beams;
(f) first and second image forming reflecting means supported by the other of said optical components and disposed respectively in said first and second light beam paths to receive light proceeding from said first and second indexing means and to image said first and second indexing means in proximate juxtaposition at a mutual plane; and
(g) means for observing the displacement between said images at said mutual plane, said displacement being a function of the relative orientation of said components about said major axis.

5. A self-checking optical system according to claim 4 including means for measuring said displacement, said measuring means being calibrated in units of actual deviation in relative orientation of said components about said major axis.

6. A self-checking optical system comprising:
(a) a housing;
(b) a first optical component mounted within said housing for receiving and transmitting incident light rays;
(c) a second optical component mounted within said housing for receiving light rays transmitted from said first component along a major datum axis and for further transmitting said light rays parallel to said light rays received by said first component;
(d) first indexing means connected to said first component;
(e) second indexing means connected to said first component and lying in a common plane with said first indexing means, said plane being perpendicular to said datum axis;
(f) an objective connected to said first component;
(g) third indexing means connected to said first component and disposed at the focal plane of said objective;
(h) first image-forming reflecting means connected to said second component;
(i) second image-forming reflecting means connected to said second component;
(j) zero power reflecting means connected to said second component;

(k) means for projecting first and second light beams respectively to said first and second indexing means, thence to said first and second image-forming reflecting means along paths parallel to said datum axis, said reflecting means being so disposed as to form images of said first and second indexing means in proximate juxtaposition at a common image plane;
(l) means for projecting a third light beam to said third indexing means, thence to said objective from which said beam emerges as collimated light, thence to said zero power reflecting means along a path parallel to said datum axis, said reflecting means being so disposed as to reflect said beam to said ojective, whereby an image of said third indexing means is formed at said focal plane;
(m) means for observing said first and second index images and establishing the separation between said images at said image plane, variations in said separation indicating deviations in relative orientation of said first and second components with respect to said major axis; and
(n) means for observing said third indexing means and its image and establishing the separations between said third indexing means and its image in two perpendicular directions at said focal plane, variations in said separations indicating deviations in relative orientation of said first and second components with respect to two perpendicular axes disposed normal to said major datum axis.

7. A self-checking optical system comprising:
(a) a housing;
(b) a first optical component mounted within said housing for receiving and transmitting incident light rays;
(c) a second optical component mounted within said housing for receiving light rays transmitted from said first component along a major datum axis and for further transmitting said light rays parallel to said light rays received by said first component;
(d) first indexing means connected to said first component;
(e) second indexing means connected to said first component;
(f) bi-prism means connected to said second component;
(g) means for projecting first and second light beams respectively to said first and second indexing means, thence through first and second portions of said bi-prism to incidence upon said second component, said by-prism disposed so as to render said first and second beams emerging therefrom in parallelism;
(h) objective means connected to said second component and disposed in the path of said parallel light beams to form proximately juxtaposed images of said first and second indexing means at a common image plane beyond said incidence upon said second component;
(i) third indexing means connected to said second optical component and disposed at the focal plane of said objective means;
(j) zero power reflecting means connected to said first optical component;
(k) means for projecting a third beam of light to said third indexing means, thence to incidence upon said second component, thence to said objective from which said beam emerges as collimated light, thence to said zero power reflecting means, said reflecting means being so disposed as to reflect said beam to said objective, whereby an image of said third indexing means is formed at said focal plane;
(l) means for observing said first and second index images and establishing the separation between said images at said image plane, variations in said separation indicating deviations in relative orientation of said first and second components with respect to said major axis; and (m) means for observing said third indexing means and its image and establishing the separations between said third indexing means and its image in two perpendicular directions at said focal plane, variations in said separations indicating deviations in relative orientation of said first and second components with respect to two perpendicular axes disposed normal to said major datum axis.

References Cited by the Examiner

UNITED STATES PATENTS

| | | | |
|---|---|---|---|
| 1,921,630 | 8/1933 | Mechau | 88—2.6 X |
| 2,402,856 | 6/1946 | Turrettini | 88—14 X |
| 2,474,602 | 6/1949 | Turrettini | 88—14 X |
| 2,481,551 | 9/1949 | Williams | 88—1 |
| 2,520,866 | 8/1950 | Wells | 88—14 |
| 2,557,807 | 12/1951 | Pryor | 88—74 X |
| 2,905,047 | 9/1959 | Vogl | 88—14 |
| 2,978,950 | 4/1961 | Mandler | 88—14 |
| 3,021,749 | 2/1962 | Merlen | 88—14 X |

FOREIGN PATENTS 309,213  10/1920  Germany.

OTHER REFERENCES

Hume: "Alignment Testing," a technical paper published by Engis Equipment Company, Chicago, Illinois. Received U.S. Patent Office on May 24, 1957, 8 pages.

JEWELL H. PEDERSEN, *Primary Examiner.*

E. G. ANDERSON, D. H. RUBIN, T. L. HUDSON, A. A. KASHINSKI, *Assistant Examiners.*